(12) United States Patent
Suzuki et al.

(10) Patent No.: US 8,282,527 B2
(45) Date of Patent: Oct. 9, 2012

(54) CONTROL APPARATUS FOR HYBRID VEHICLE

(75) Inventors: Shingo Suzuki, Sagamihara (JP); Kan Yagi, Fuji (JP)

(73) Assignee: Jatco Ltd, Fuji-shi (JP)

( * ) Notice: Subject to any disclaimer, the term of this patent is extended or adjusted under 35 U.S.C. 154(b) by 604 days.

(21) Appl. No.: 12/558,847

(22) Filed: Sep. 14, 2009

(65) Prior Publication Data

US 2010/0075798 A1 Mar. 25, 2010

(30) Foreign Application Priority Data

Sep. 24, 2008 (JP) ................................ 2008-243650

(51) Int. Cl.
*B60W 10/02* (2006.01)
*B60W 10/08* (2006.01)

(52) U.S. Cl. .......................................... 477/5; 903/914

(58) Field of Classification Search ........ 477/5; 701/67; 903/912, 914
See application file for complete search history.

(56) References Cited

U.S. PATENT DOCUMENTS

| | | | |
|---|---|---|---|
| 6,556,910 B2 * | 4/2003 | Suzuki et al. | 701/54 |
| 6,988,572 B2 * | 1/2006 | Tatara et al. | 180/65.26 |
| 7,351,182 B2 * | 4/2008 | Kobayashi | 477/5 |
| 2005/0082098 A1 | 4/2005 | Ito et al. | |
| 2006/0272869 A1 | 12/2006 | Hidaka et al. | |
| 2007/0278022 A1 * | 12/2007 | Tanishima | 180/65.2 |

FOREIGN PATENT DOCUMENTS

| | | |
|---|---|---|
| EP | 1 839 986 A1 | 10/2007 |
| JP | 05-330349 A | 12/1993 |
| JP | 2006-306325 A | 11/2006 |
| JP | 2007-015679 A | 1/2007 |

\* cited by examiner

*Primary Examiner* — Justin Holmes
*Assistant Examiner* — Huan Le
(74) *Attorney, Agent, or Firm* — Foley & Lardner LLP

(57) ABSTRACT

A control apparatus of hybrid vehicle having a first clutch which is in a disengaged state by being supplied with hydraulic fluid and a second clutch which is in an engaged state by being supplied with the hydraulic fluid, has a line pressure controller controlling a line pressure of the hydraulic fluid, and a drive mode controller changing a drive mode between HEV mode in which the first clutch is engaged and the vehicle travels with the engine and the motor/generator being a power source and EV mode in which the first clutch is disengaged and the vehicle travels with only the motor/generator being the power source. The line pressure controller sets the line pressure in HEV mode to a pressure level required for the engagement of the second clutch, and sets the line pressure in EV mode to a higher line pressure than the line pressure in HEV mode.

15 Claims, 7 Drawing Sheets

CONTROL APPARATUS FOR HYBRID VEHICLE

BACKGROUND OF THE INVENTION

The present invention is applied to a hybrid vehicle, and relates to a control apparatus controlling a line pressure that engages/disengages a clutch in a driveline for the hybrid vehicle.

In recent years, there have been proposed and developed various hybrid vehicles. The hybrid vehicle has a hybrid driveline in which an engine, a first clutch, a motor/generator, a second clutch, and driving wheels are connected in this order. Both the first and second clutches are hydraulic clutches whose engagement/disengagement are controlled by hydraulic fluid (or working fluid). In such hybrid vehicles, for example, in Japanese Patent Provisional Publication No. 2007-15679 (hereinafter is referred to as "JP2007-15679"), in an EV mode (an electric drive mode) in which the engine stops and the vehicle travels by only power of the motor/generator, the first clutch is disengaged. In an HEV mode (a hybrid drive mode) in which the vehicle travels by both power of the engine and the motor/generator, the first clutch is engaged.

SUMMARY OF THE INVENTION

In the related art hybrid vehicles, a so-called normally-closed type clutch, which is disengaged by supply of the hydraulic fluid, could be employed as the first clutch in order that the vehicle can travel even when hydraulic system failure occurs. In this case, since a high pressure is necessary when disengaging the first clutch, a required minimum line pressure in the EV mode in which the first clutch is disengaged becomes higher than a required minimum line pressure in the HEV mode in which the first clutch remains engaged. Here, normally, the line pressure is set to a minimum pressure level required to engage/disengage the clutch. Thus, the line pressure in the hybrid vehicle is set to the required minimum line pressure of the EV mode irrespective of the drive mode. However, because of this line pressure setting, in the HEV mode in which there is no need to disengage the first clutch, the line pressure is set to an unnecessarily high pressure level. For this reason, there is a problem that gives rise to increase in a loss of power and deterioration of fuel economy.

It is therefore an object of the present invention to provide a control apparatus of the hybrid vehicle, which is capable of easily obtaining a required pressure by which the first clutch is put in a disengaged state also capable of changing the setting of the line pressure in accordance with the drive mode, and thereby improving the fuel economy.

According to one aspect of the present invention, a control apparatus of a hybrid vehicle, the hybrid vehicle having a first clutch which is arranged between an engine and a motor/generator and is in a disengaged state by being supplied with a hydraulic fluid and a second clutch which is arranged between the motor/generator and driving wheels and is in an engaged state by being supplied with the hydraulic fluid, the control apparatus comprises: a line pressure controller that controls a line pressure of the hydraulic fluid supplied to the first and second clutches; and a drive mode controller that changes a drive mode between an HEV mode in which the first clutch is engaged and the vehicle travels with the engine and the motor/generator being a power source and an EV mode in which the first clutch is disengaged and the vehicle travels with only the motor/generator being the power source, and the line pressure controller sets the line pressure in the HEV mode to a pressure level required for the engagement of the second clutch and sets the line pressure in the EV mode to a higher line pressure than the line pressure in the HEV mode.

According to another aspect of the invention, a method for controlling a line pressure of a hydraulic fluid for a hybrid vehicle, the hybrid vehicle having a first clutch which is arranged between an engine and a motor/generator and is in a disengaged state by being supplied with the hydraulic fluid and a second clutch which is arranged between the motor/generator and driving wheels and is in an engaged state by being supplied with the hydraulic fluid, the hybrid vehicle further having the following drive modes; an HEV mode in which the first clutch is engaged and the vehicle travels with the engine and the motor/generator being a power source and an EV mode in which the first clutch is disengaged and the vehicle travels with only the motor/generator being the power source, the method comprises: setting the line pressure in the HEV mode to a pressure level required for the engagement of the second clutch, and setting the line pressure in the EV mode to a higher line pressure than the line pressure in the HEV mode.

The other objects and features of this invention will become understood from the following description with reference to the accompanying drawings.

DETAILED DESCRIPTION OF THE INVENTION

According to a control apparatus of a hybrid vehicle of the present invention, in a case where a first clutch is engaged and a drive mode is changed to an HEV mode in which the vehicle travels with an engine and a motor/generator being the power source by a drive mode control means, a line pressure is set to a line pressure that is a pressure level required for an engagement of a second clutch by a line pressure control means (a line pressure controller). Further, in a case where the first clutch is disengaged and the drive mode is changed to an EV mode in which the vehicle travels with only the motor/generator being the power source by the drive mode control means, the line pressure is set to a line pressure that is a higher pressure level than that in the HEV mode by the line pressure control means.

That is, in the HEV mode, the line pressure is set to the line pressure that is the pressure level required for the engagement of the second clutch, while in the EV mode, the line pressure is set to the line pressure that is the higher pressure level than the line pressure of the HEV mode. Thus, in the HEV mode in which the required line pressure is low, the line pressure can remain held at the pressure level which is equal to a pressure level in a so-called engine vehicle. In the EV mode, it is possible to readily obtain the high line pressure for disengaging the first clutch.

As a result, it is possible to readily obtain the required pressure that puts the first clutch in a disengaged state, and to improve the fuel economy by changing the setting of the line pressure in accordance with the drive mode.

Embodiments of the present invention will now be explained below with reference to the drawings.

[Embodiment 1]

Figure 1:
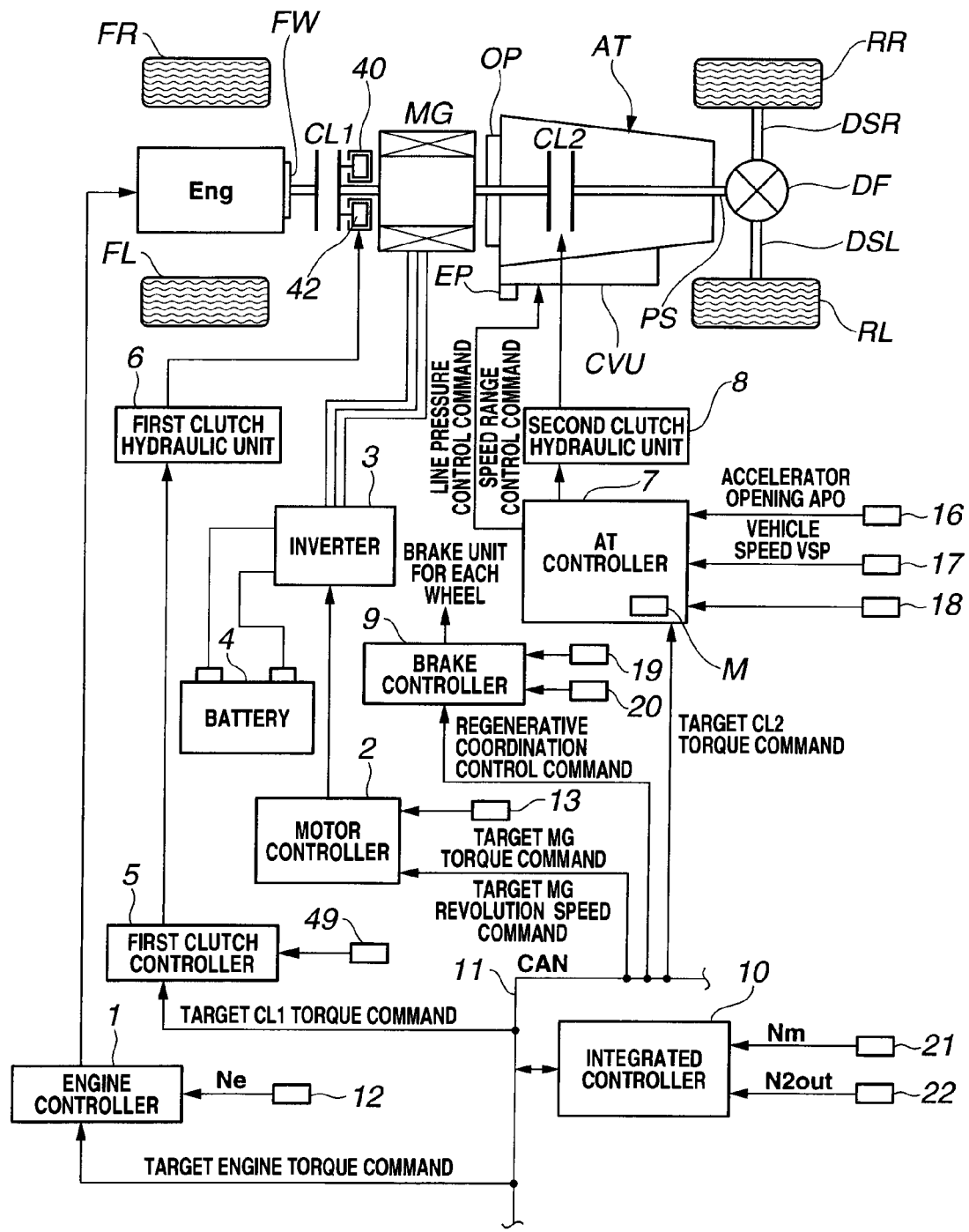
FIG. 1 is a system block diagram showing a rear-wheel-drive FR hybrid vehicle (an example of the hybrid vehicle) employing a control apparatus of an embodiment 1.

First, the whole system of the present invention will be explained. FIG. 1 is a system block diagram showing a rear-wheel-drive FR hybrid vehicle (an example of the hybrid vehicle) employing a control apparatus of an embodiment 1.

As can be seen in FIG. 1, a driveline of the FR hybrid vehicle in the embodiment 1 has an engine Eng, a flywheel FW, a first clutch CL1, a motor/generator MG, an automatic transmission AT, a second clutch CL2, a propeller shaft PS, a differential gear DF, a left drive shaft DSL, a right drive shaft DSR, a rear-left wheel (driving wheel) RL, a rear-right wheel (driving wheel) RR, and a mechanical oil pump (mechanical pump) OP.

The engine Eng is a gasoline engine or a diesel engine, and the flywheel FW is provided on an engine output shaft. On the basis of an engine control command from an engine controller 1, an engine start control, an engine stop control and a valve opening control of a throttle valve are carried out.

The first clutch CL1 is installed between the engine Eng and the motor/generator MG. The first clutch CL1 is a clutch that is put in a disengaged state by being supplied with the hydraulic fluid.

Engagement/disengagement including slip-engagement and slip-disengagement, of the first clutch CL1, are controlled by a first clutch control pressure that is produced by a first clutch hydraulic unit 6 on the basis of a first clutch control command from a first clutch controller 5.

The motor/generator MG is a synchronous motor/generator in which a permanent magnet is embedded in a rotor and a stator coil is wound around a stator. On the basis of a control command from a motor controller 2, the motor/generator MG is controlled through the application of a three-phase alternating current that is generated by an inverter 3. This motor/generator MG works as an electric motor that performs a rotational drive operation by receiving a power from a battery 4 (hereinafter, this state is called a power running state). And also, in a case where the rotor is rotated by receiving a rotational energy from the engine Eng or the rear left and right wheels RL, RR, the motor/generator MG works as a generator that generates an electromotive force at both ends of the stator coil, and is able to charge the battery 4 (hereinafter, this operating state is called a regenerative state). The rotor of this motor/generator MG is connected to an input shaft of the automatic transmission AT through a damper (not shown).

The automatic transmission AT is a multi-range transmission that automatically changes a shift position of multispeed (multistage) of, for example, forward 7 speeds and reverse 1 speed according to a vehicle speed and an accelerator opening and so on. An output shaft of the automatic transmission AT is connected to the rear left and right wheels RL, RR through the propeller shaft PS, the differential gear DF, the left drive shaft DSL and the right drive shaft DSR.

The second clutch CL2 is installed between the motor/generator MG and the rear left and right wheels RL, RR. The second clutch CL2 is a clutch that is put in an engaged state by being supplied with the hydraulic fluid. Engagement/disengagement including slip-engagement and slip-disengagement, of the second clutch CL2, are controlled by a control pressure that is produced by a second clutch hydraulic unit 8 on the basis of a second clutch control command from an AT controller 7. The second clutch CL2 is not a clutch that is newly added as a special clutch, but an optimum clutch or brake arranged on a torque transmission path of the driveline, among a plurality of frictional engagement elements which are engaged in each speed or each shift stage in the automatic transmission AT, is selected as the second clutch CL2. For instance, a wet multiple disc clutch or a wet multiple disc brake, which is capable of continuously controlling an oil flow amount and the oil pressure through a proportional solenoid, is used.

The first clutch hydraulic unit 6 and the second clutch hydraulic unit 8 are built into a hydraulic control valve unit CVU that is provided at the automatic transmission AT. Further, this hydraulic control valve unit CVU is provided with an electric pump EP. As the electric pump EP, a pump that produces a discharge pressure with a pump motor EPM being a power source, such as an internal gear pump, an external gear pump and a vane pump, is used. A discharge oil from this electric pump EP is supplied to the first clutch hydraulic unit 6 and the second clutch hydraulic unit 8.

The mechanical oil pump OP is placed between the motor/generator MG and the second clutch CL2. As the mechanical oil pump OP, the internal gear pump, the external gear pump or the vane pump etc. which produces the discharge pressure with at least one of the engine Eng and the motor/generator MG being the power source, is used. A discharge oil from this mechanical oil pump OP is supplied to the first clutch hydraulic unit 6 and the second clutch hydraulic unit 8.

Figure 2:
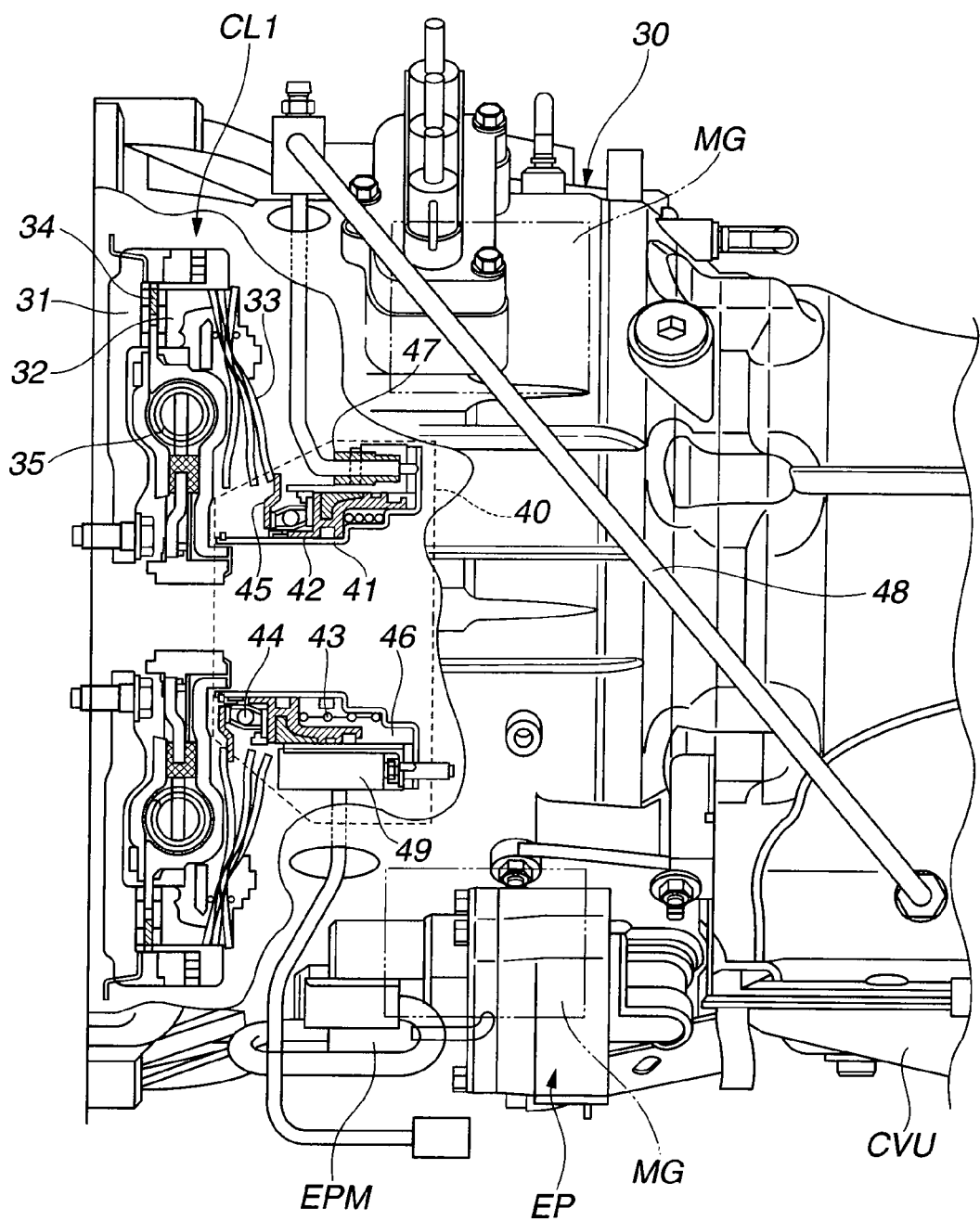
FIG. 2 is a local sectional view showing the FR hybrid vehicle employing the control apparatus of the embodiment 1.

FIG. 2 is a local sectional view showing the FR hybrid vehicle employing the control apparatus of the embodiment 1.

In the hybrid vehicle in FIG. 1, the engine Eng and the automatic transmission AT are connected through the first clutch CL1. As mentioned above, the engagement/disengagement control of this first clutch CL1 is carried out using the first clutch control pressure produced by the first clutch hydraulic unit 6 that is built into the hydraulic control valve unit CVU.

As shown in FIG. 2, the first clutch CL1 is a dry single disc clutch that is installed inside a clutch-and-motor case 30 that is connected between the engine Eng and the automatic transmission AT. The first clutch CL1 has a clutch cover 31, a pressure plate 32, a diaphragm spring 33, a clutch disc 34, and a torsional damper 35.

The clutch cover 31 is a metal cover that holds a rotating first clutch mechanism. The clutch cover 31 is secured to the flywheel FW (see FIG. 1), then rotates all the time together with the engine Eng while the engine Eng is rotating. The pressure plate 32 is fixed inside the clutch cover 31, also the diaphragm spring 33 is fixed at a middle portion of the clutch cover 31. The pressure plate 32 and the clutch disc 34 are then tightly fitted by a force of the diaphragm spring 33. On both surfaces of the clutch disc 34, for the purpose of easing or lessening a contact shock (clutch engagement shock), springs (normally, four to six springs) called the torsional damper 35 are provided.

Further, a CSC (Concentric Slave Cylinder) 40 is accommodated inside the clutch-and-motor case 30. This CSC 40 is a hydraulic actuator that is coaxially aligned with the first clutch CL1. The CSC 40 has a CSC cylinder 41, a CSC piston 42, a CSC spring 43, a release bearing 44, a spring pushing plate 45, a clutch working pressure chamber 46, and a clutch working pressure port 47.

The release bearing 44 is a bearing which serves to apply a force to the diaphragm spring 33 via the spring pushing plate 45 then disengages/engages (disconnects/connects) the first clutch CL1. The release bearing 44 slides in an axial direction by a relationship of forces (a force by the diaphragm spring 33, a force by the CSC spring 43, a force by the clutch working pressure) which are applied to the CSC piston 42. Here, the clutch working pressure is a pressure of the hydraulic fluid which is controlled in the hydraulic control valve unit CVU and supplied to the clutch working pressure chamber 46 in the CSC cylinder 41 from the first clutch hydraulic unit 6 through a CSC pipe 48. A shift amount (stroke position) of the CSC piston 42 is measured by a stroke sensor 49, and this measurement information is inputted to the first clutch controller 5 for use of the engagement control of the first clutch CL1.

Furthermore, the clutch-and-motor case 30 houses the motor/generator MG, and the CSC 40 is placed on an inner side of the rotor of the motor/generator MG.

The driveline in the hybrid vehicle described above has the following two drive modes; a hybrid vehicle drive mode (hereinafter called HEV mode) in which the first clutch CL1 is engaged and the vehicle travels with the engine Eng and the motor/generator MG being the power source, and an electric vehicle drive mode (hereinafter called EV mode) in which the first clutch CL1 is disengaged and the vehicle travels with only the motor/generator MG being the power source. As will be described later, upon a command of a mode change from the HEV mode to the EV mode, the mode shifts to an HEV→EV transition mode. Conversely, upon a command of the mode change from the EV mode to the HEV mode, the mode shifts an EV→HEV transition mode.

Next, a control system of the hybrid vehicle will be explained.

As shown in FIG. 1, the control system of the FR hybrid vehicle has the engine controller 1, the motor controller 2, the inverter 3, the battery 4, the first clutch controller 5, the first clutch hydraulic unit 6, the AT controller 7, the second clutch hydraulic unit 8, a brake controller 9, and an integrated controller 10. Here, the engine controller 1, the motor controller 2, the first clutch controller 5, the AT controller 7, the brake controller 9 and the integrated controller 10 are connected with each other through a CAN (Controller Area Network) communication line 11 that allows an information exchange between controllers.

The engine controller 1 inputs an engine rpm Ne that is detected by an engine rpm sensor 12 and a target engine torque command from the integrated controller 10, also inputs the other information. Then the engine controller 1 outputs a command that controls an engine operating point (Ne, Te) to a throttle valve actuator etc. of the engine Eng.

The motor controller 2 inputs a rotor rotational position of the motor/generator MG which is detected by a resolver 13, a target MG torque command and a target MG revolution speed command from the integrated controller 10, also inputs the other information. Then the motor controller 2 outputs a command that controls a motor operating point (Nm, Tm) of the motor/generator MG to the inverter 3. In addition, the motor controller 2 measures or checks a battery SOC that indicates a state of charge of the battery 4. This battery SOC information is used for the control of the motor/generator MG, and also is sent to the integrated controller 10 through the CAN communication line 11.

The first clutch controller 5 inputs the stroke position of the CSC piston 42 of the CSC 40 which is detected by the stroke sensor 49 and a target CL1 torque command from the integrated controller 10, also inputs the other information. Then the first clutch controller 5 outputs a command that controls the engagement/disengagement of the first clutch CL1 to the first clutch hydraulic unit 6 in the hydraulic control valve unit CVU.

The AT controller 7 inputs information from an accelerator opening sensor 16, a vehicle speed sensor 17 and a second clutch pressure sensor 18. Then, during the travel with a D-range selected, the AT controller 7 searches an optimum speed range (optimum speed stage) according to a position on a shift map, of the operating point determined by an accelerator opening APO and a vehicle speed VSP, and also outputs a speed range control command that achieves the searched speed range to the hydraulic control valve unit CVU. Here, the shift map is a map where an up-shift line and a down-shift line are drawn according to the accelerator opening and the vehicle speed.

In addition to the automatic transmission control, the AT controller 7 reads the target engine torque command, the target MG torque command and a target mode from the integrated controller 10, and controls the line pressure produced by the hydraulic control valve unit CVU by outputting a line pressure control command that controls the line pressure of the hydraulic fluid.

Moreover, when inputting a target CL2 torque command, the AT controller 7 executes a second clutch control in which a command that controls the engagement/disengagement of the second clutch CL2 is outputted to the second clutch hydraulic unit 8 in the hydraulic control valve unit CVU.

The brake controller 9 inputs sensor information from a wheel speed sensor 19 for detecting each wheel speed of four wheels and a brake stroke sensor 20 and a regenerative coordination control command from the integrated controller 10, also inputs the other information. Then, for instance, in a case where the bake is applied by only a regenerative braking force upon a brake operation by brake pedal depression, when the braking force is lacking for a required braking force according to a brake stroke BS of the brake pedal depression, the brake controller 9 performs a regenerative coordination brake control so that the shortage of the braking force is compensated by a mechanical braking force (a hydraulic braking force or a motor braking force).

The integrated controller 10 is a controller that controls a consumption energy of the whole vehicle, and in order for the hybrid vehicle to travel at a maximum efficiency, the integrated controller 10 performs the operation. The integrated controller 10 inputs information from a motor revolution speed sensor 21 for detecting the motor revolution speed Nm and a second clutch output revolution speed sensor 22 for detecting a second clutch output revolution speed N2out, also inputs the other information through the CAN communication line 11. Then the integrated controller 10 outputs the target engine torque command to the engine controller 1, outputs the target MG torque command and the target MG revolution speed command to the motor controller 2, outputs the target CL1 torque command to the first clutch controller 5, outputs the target CL2 torque command to the AT controller 7, and outputs the regenerative coordination control command to the brake controller 9.

Figure 3:
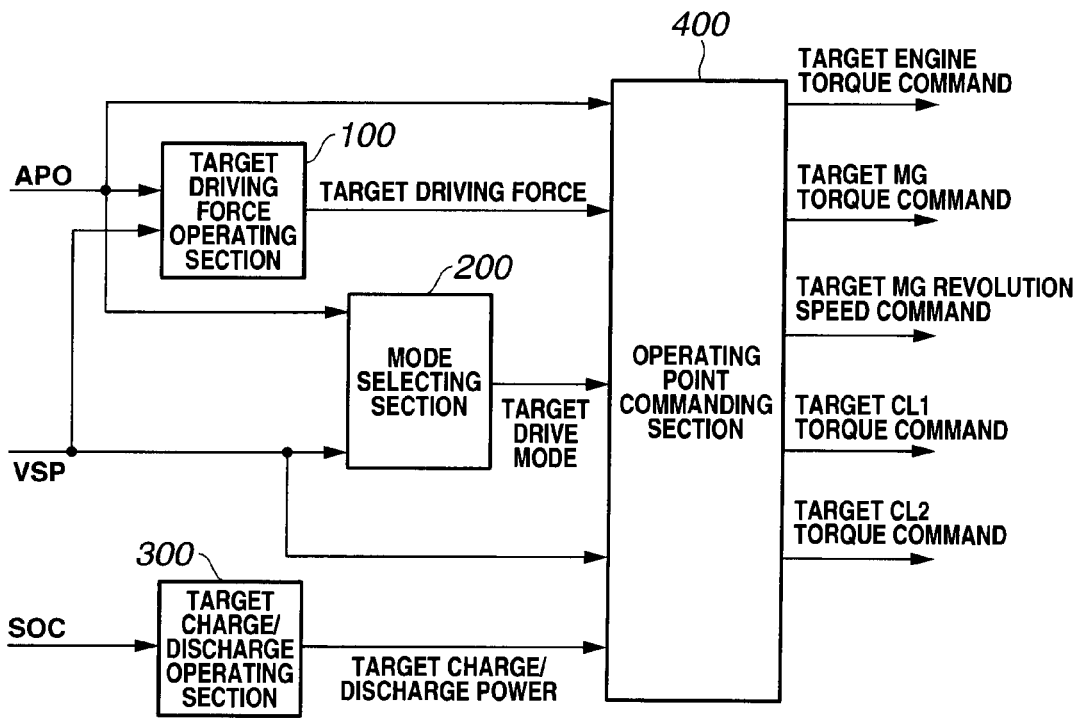
FIG. 3 is a control block diagram showing an operation process executed in an integrated controller in the FR hybrid vehicle employing the control apparatus of the embodiment 1.
Figure 4:
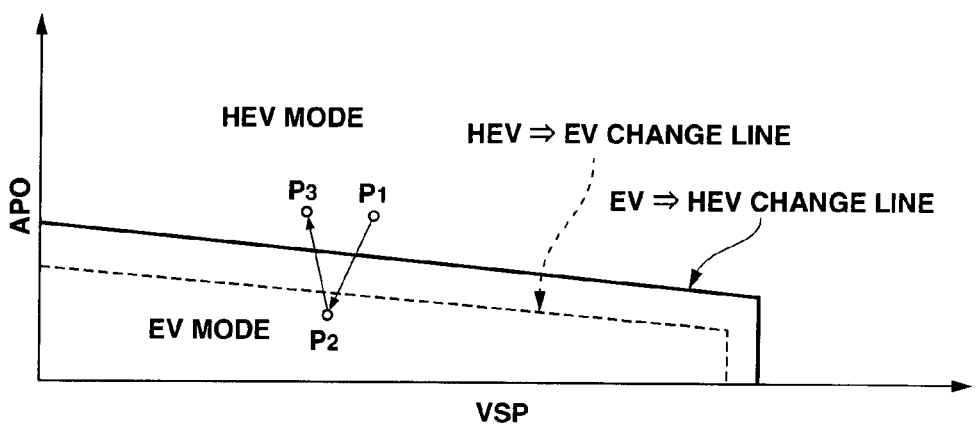
FIG. 4 is an EV-HEV selection map used when performing a mode selection operation in the integrated controller in the FR hybrid vehicle.

FIG. 3 is a control block diagram showing an operation process executed in the integrated controller 10 in the FR hybrid vehicle employing the control apparatus of the embodiment 1. FIG. 4 is an EV-HEV selection map used when performing a mode selection operation in the integrated controller 10 in the FR hybrid vehicle.

In the following, the operation process executed in the integrated controller 10 will be explained with reference to FIGS. 3 and 4.

As shown in FIG. 3, the integrated controller 10 has a target driving force operating section 100, a mode selecting section (drive mode control means or drive mode controller) 200, a target charge/discharge operating section 300, and an operating point commanding section 400.

The target driving force operating section 100 calculates a target driving force tFo0 on the basis of the accelerator opening APO and the vehicle speed VSP using a target driving force map.

The mode selecting section 200 selects the EV mode or the HEV mode as the target drive mode from the accelerator opening APO and the vehicle speed VSP using the EV-HEV selection map shown in FIG. 4. However, if the battery SOC is lower than or equal to a predetermined value, the target drive mode is set to the HEV mode compulsorily or forcibly.

The target charge/discharge operating section 300 calculates a target charge/discharge power tP from the battery SOC using a target charge/discharge amount map.

The operating point commanding section 400 calculates the target engine torque, the target MG torque, the target MG revolution speed, the target CL1 torque and the target CL2 torque, as an operating point attainment target, on the basis of input information such as the accelerator opening APO, the target driving force tFo0, the target drive mode, the vehicle speed VSP and the target charge/discharge power tP. Then the operating point commanding section 400 outputs the target engine torque command, the target MG torque command and the target MG revolution speed command, the target CL1 torque command, the target CL2 torque command to the controllers 1, 2, 5 and 7 respectively through the CAN communication line 11.

Figure 5:
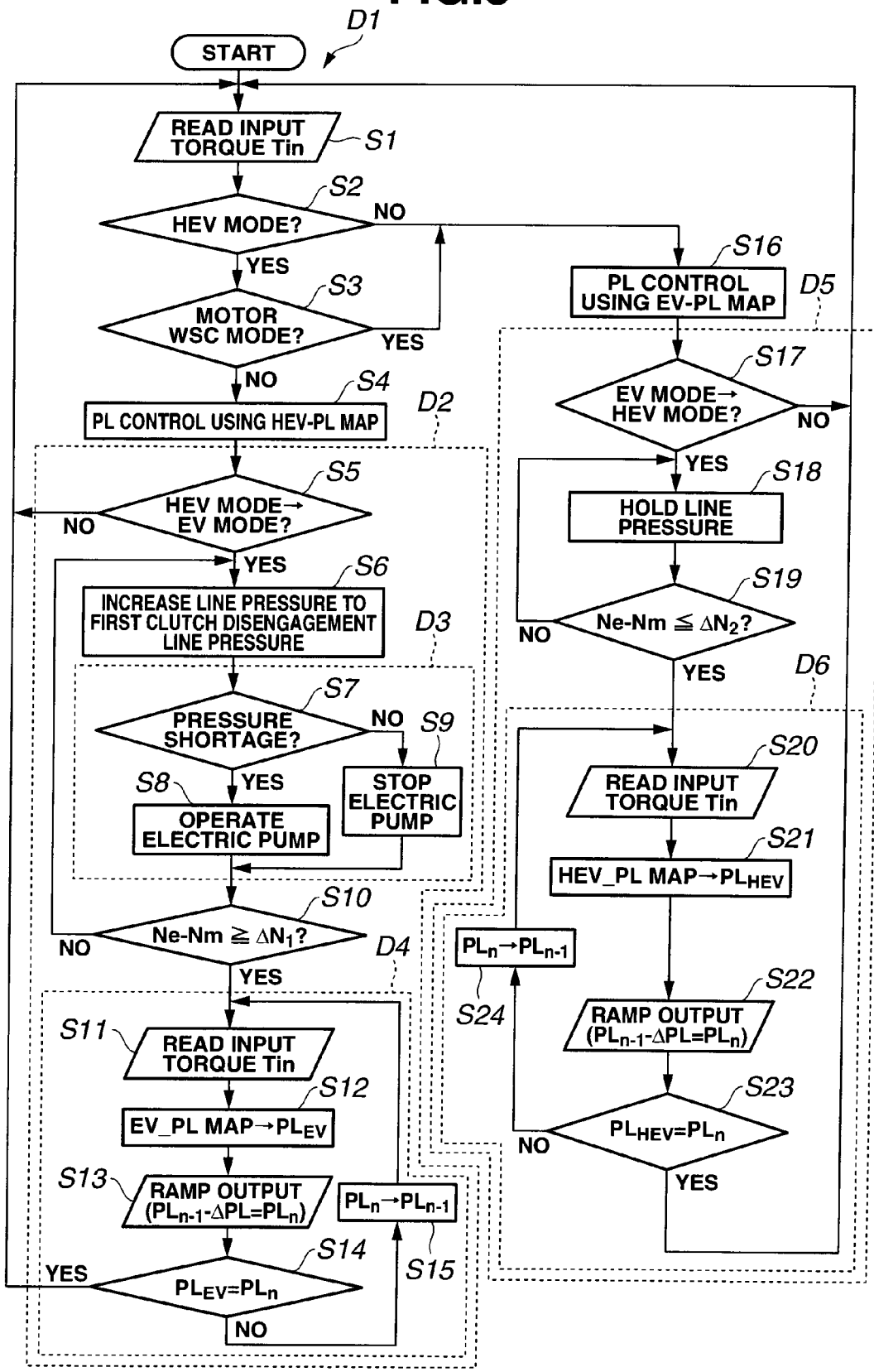
FIG. 5 is a flow chart showing a flow of a line pressure control operation executed in the control apparatus of the embodiment 1.

FIG. 5 is a flow chart showing a flow of a line pressure control operation (line pressure control means) D1 executed in the control apparatus of the embodiment 1. Each operation step in the flow chart will be explained below.

At step S1, an input torque Tin to the second clutch CL2 is read, and the routine proceeds to step S2. Here, the input torque Tin is determined by adding the target engine torque and the target MG torque which are read in the integrated controller 10.

At step S2, subsequent to the reading of the input torque Tin at step S1, a judgment is made as to whether or not the drive mode of the hybrid vehicle is the HEV mode. If YES (HEV mode), the routine proceeds to step S3. If NO (EV mode), the routine proceeds to step S16. Here, the drive mode of the vehicle is judged by the target mode that is read in the integrated controller 10.

At step S3, subsequent to step S2 at which the drive mode is judged to be the HEV mode, a judgment is made as to whether or not a motor WSC mode is selected. If YES (the motor WSC mode is selected), the routine proceeds to step S16. If NO (the motor WSC mode is not selected), the routine proceeds to step S4. Regarding the judgment as to whether the motor WSC mode is selected, it is judged by the presence or absence of a command of a motor WSC control from the AT controller 7. Here, this motor WSC control is a control in which, under a condition in which a normal WSC control that executes a slip-control of the second clutch CL2 is carried out with the first clutch CL1 engaged while the engine Eng is working, when heat load of the slip-engaged second clutch CL2 becomes excessively large, in order to reduce a slip amount of the second clutch CL2, the first clutch CL1 is controlled to the disengaged state to cut or disconnect power from the engine Eng.

Figure 6:
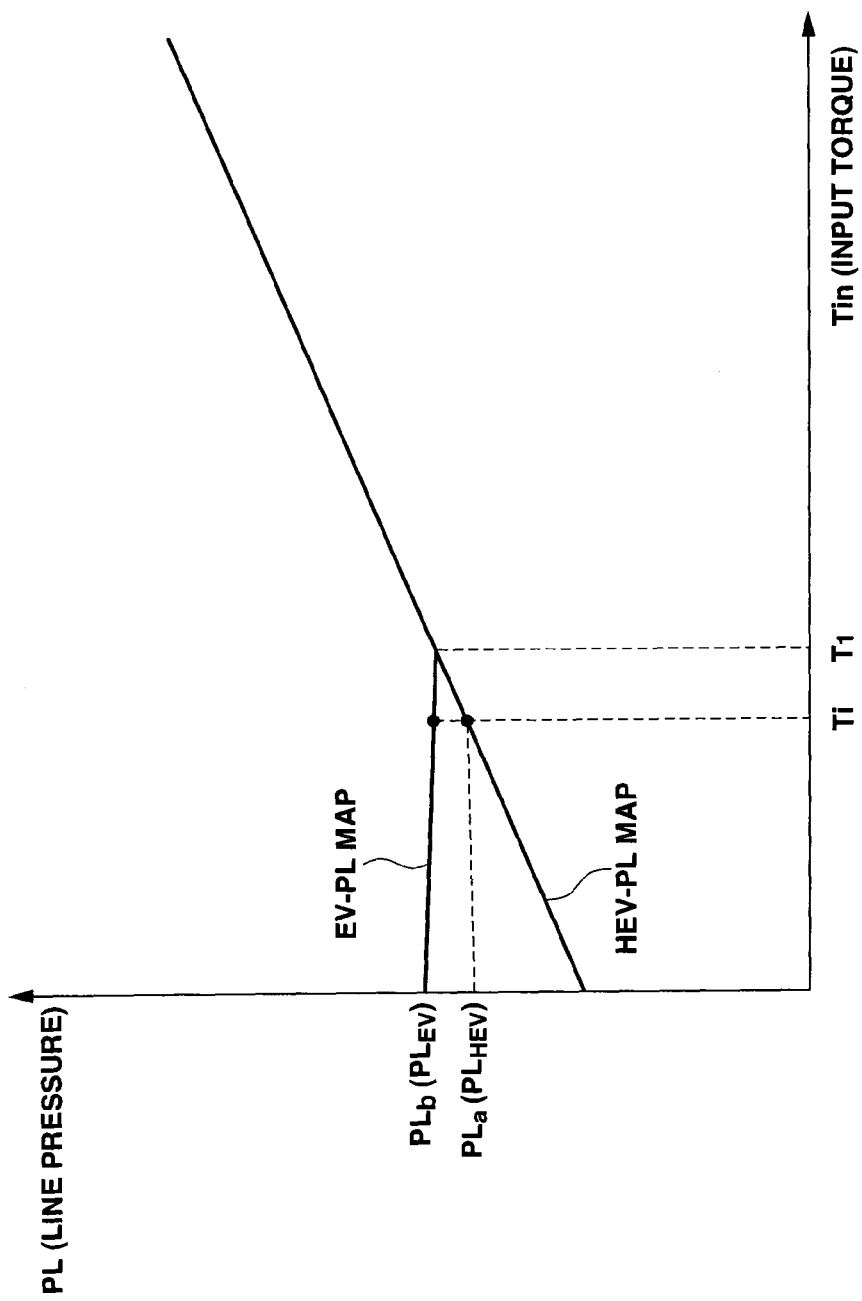
FIG. 6 is an HEV-PL map and an EV-PL map which are stored in the control apparatus of the embodiment 1.

At step S4, subsequent to the judgment of non-selection of the motor WSC mode at step S3, the line pressure control is executed using an HEV-PL map, and the routine proceeds to step S5. Here, the HEV-PL map is, as shown in FIG. 6, an HEV mode line pressure characteristic that proportionately increases according to the input torque Tin to the second clutch CL2, which is a line pressure setting parameter, while securing a pressure level required for the engagement of the second clutch CL2. This HEV mode line pressure characteristic (the HEV-PL map) is previously stored in a memory (a line pressure characteristic setting section) M provided in the AT controller 7.

This line pressure control is performed by setting a line pressure PL to an HEV mode line pressure $PL_{HEV}$ (e.g. PLa) which is determined by the input torque Tin (e.g. Ti) read at step S1 and the HEV-PL map. More specifically, the line pressure control is carried out by the following procedure; outputting an electric signal to a line pressure solenoid from the AT controller 7→producing a signal pressure by an ON-controlled line pressure solenoid from the electric signal→applying a force to a regulator valve by the produced signal pressure→regulating the line pressure PL by the regulator valve.

At step S5, subsequent to the line pressure control using the HEV-PL map at step S4, a judgment is made as to whether or not the command of the mode change from the HEV mode to the EV mode is issued. If YES (the command of HEV→EV mode change is issued), the routine proceeds to step S6. If NO (no HEV→EV mode change command is issued), the routine returns to step S1. With regard to the presence or absence of the mode change command, it is judged according to whether the target mode read in the integrated controller 10 crosses an HEV→EV change line (or HEV→EV switch line) on the EV-HEV selection map in FIG. 4. That is, if the target mode changes from $P_1$ to $P_2$ ($P_1$→$P_2$), the mode change command is judged to be present.

At step S6, subsequent to the judgment of the presence of the HEV→EV mode change command at step S5, the line pressure PL is increased up to a first clutch disengagement line pressure $PL_{CL1}$ that is a pressure level required to disengage the first clutch CL1, namely that the line pressure PL is set to the first clutch disengagement line pressure $PL_{CL1}$, and the routine proceeds to step S7. Here, the increase of the line pressure PL is achieved by raising the discharge pressure of the hydraulic fluid from the mechanical oil pump OP.

At step S7, subsequent to the increase control of the line pressure PL at step S6, a judgment is made as to whether or not an oil amount shortage (pressure shortage) occurs. If YES (the oil amount shortage occurs), the routine proceeds to step S8. If NO (the oil amount is sufficient), the routine proceeds to step S9. With respect to the judgment of the oil amount shortage, it is judged by a pressure increasing (rising) speed of the line pressure PL etc.

At step S8, subsequent to the judgment of the occurrence of the oil amount shortage at step S7, the electric pump EP is operated to discharge an oil amount equivalent to the shortage, and the routine proceeds to step S10.

At step S9, subsequent to the judgment of the sufficient oil amount at step S7, the electric pump EP is stopped, and the routine proceeds to step S10.

At step S10, subsequent to the electric pump operation at step S8 or the stop of the electric pump at step S9, a judgment is made as to whether or not a revolution speed difference (difference of the revolution speed) between the engine rpm Ne and the motor revolution speed Nm is greater than or equal to a first threshold value $\Delta N_1$, i.e. a judgment is made as to whether or not the disengagement of the first clutch CL1 starts. If YES (the revolution speed difference is the first threshold value $\Delta N_1$ or more), the routine proceeds to step S11. If NO (the revolution speed difference is less than the first threshold value $\Delta N_1$), the routine proceeds to step S6.

At step S11, subsequent to step S10 at which the revolution speed difference is judged to be the first threshold value $\Delta N_1$ or more, the input torque Tin to the second clutch CL2 is read, and the routine proceeds to step S12.

At step S12, subsequent to the reading of the input torque Tin at step S11, an EV mode line pressure $PL_{EV}$ is is set to a value (line pressure) obtained by an EV-PL map in FIG. 6, and the routine proceeds to step S13.

At step S13, subsequent to the setting of the EV mode line pressure $PL_{EV}$ at step S12, a ramp output control of the line pressure is executed, and the routine proceeds 20 to step S14. With respect to the ramp output control, first, as an initial value of an operation value $PL_{n-1}$, the first clutch disengagement line pressure $PL_{CL1}$ is set. And a constant value $\Delta PL$ is subtracted from this operation value $PL_{n-1}$ (at the start of operation, it is $PL_{CL1}$), then a calculation value $PL_n$ is determined. By setting this calculation value $PL_n$ as the line pressure PL, the ramp output control is executed.

At step S14, subsequent to the ramp output control at step S13, a judgment is made as to whether or not a currently set line pressure PL, i.e. the calculation value $PL_n$ is identical with (or equal to) the EV mode line pressure $PL_{EV}$. If YES (the line pressure is identical), the routine returns to step S1. If NO (the line pressure is not identical), the routine proceeds to step S15.

At step S15, subsequent to step S14 at which it is judged that the line pressure PL is not identical with the $PL_{EV}$, the calculation value $PL_n$ is set as the operation value $PL_{n-1}$, and the routine proceeds to step S11. Then, the operation is repeated until the calculation value $PL_n$ is equal to the EV mode line pressure $PL_{EV}$.

In the flow chart, steps S5~S15 correspond to a first line pressure transition control section D2. Steps S7~S9 correspond to a disengagement pressure control operating section D3. Steps S11~S15 correspond to a first line pressure ramp control operating section D4.

Here, in the first line pressure transition control section D2, as mentioned above, the mode change command from the HEV mode to the EV mode is issued. Then when disengaging the first clutch CL1, until the revolution speed difference between the engine rpm and the motor revolution speed is the first threshold value $\Delta N_1$ or greater from the start of the disengagement, the line pressure PL is set to the first clutch disengagement line pressure $PL_{CL1}$ that is the pressure level required to disengage the first clutch CL1. After the revolution speed difference is the first threshold value $\Delta N_1$ or greater, the line pressure PL is set to the EV mode line pressure $PL_{EV}$ that can maintain the disengaged state of the first clutch CL1.

In the disengagement pressure control operating section D3, in a case where the oil amount for the first clutch disengagement line pressure $PL_{CL1}$ cannot be obtained by the discharge pressure from the mechanical oil pump OP, the oil amount shortage is compensated by the electric pump EP, namely that the oil amount equivalent to the shortage is discharged by the electric pump EP.

In the first line pressure ramp control operating section D4, the line pressure PL is gradually decreased until the line pressure PL reaches the EV mode line pressure $PL_{EV}$ from the first clutch disengagement line pressure $PL_{CL1}$.

Next, at step S16, subsequent to step S2 at which the drive mode is judged to be the EV mode, the line pressure control is carried out using the EV-PL map in FIG. 6, and the routine proceeds to step S17. Here, as can be seen in FIG. 6, the EV-PL map is an EV mode line pressure characteristic whose line pressure PL is set to a high level of the pressure that can maintain the disengaged state of the first clutch CL1 in an area (or range) where the input torque Tin cannot disengage the first clutch CL1 on the HEV mode line pressure characteristic (the HEV-PL map), i.e. in an area where the input torque Tin is a threshold torque $T_1$ or smaller.

That is, the EV-PL map is a line pressure characteristic by which, in a low torque area (torque area of the threshold torque $T_1$ or smaller) where the line pressure PL obtained by using the HEV-PL map cannot achieve the disengagement of the first clutch CL1, the line pressure PL is set to the high level of the pressure that is able to maintain the disengaged state of the first clutch CL1 irrespective of the input torque Tin. Further, the EV-PL map is a line pressure characteristic that is identical with the HEV mode line pressure characteristic in a high torque area (torque area where the input torque Tin is greater than the threshold torque $T_1$) where the line pressure PL obtained by using the HEV-PL map can disengage the first clutch CL1. This EV-PL map is previously stored in the memory (the line pressure characteristic setting section) M provided in the AT controller 7.

This line pressure control is performed by setting the line pressure PL to the EV mode line pressure $PL_{EV}$ (e.g. PLb) which is determined by the input torque Tin (e.g. Ti) read at step S1 and the EV-PL map. More specifically, the line pressure control is carried out by the following procedure; outputting an electric signal to a line pressure solenoid from the AT controller 7→producing a signal pressure by an ON-controlled line pressure solenoid from the electric signal→applying a force to a regulator valve by the produced signal pressure→regulating the line pressure PL by the regulator valve.

At step S17, subsequent to the line pressure control using the EV-PL map at step S16, a judgment is made as to whether or not the command of the mode change from the EV mode to the HEV mode is issued. If YES (the command of EV→HEV mode change is issued), the routine proceeds to step S18. If NO (no EV→HEV mode change command is issued), the routine returns to step S1. With regard to the presence or absence of the mode change command, it is judged according to whether the target mode read in the integrated controller 10 crosses an EV→HEV change line (or EV→HEV switch line) on the EV-HEV selection map in FIG. 4. That is, if the target mode changes from $P_2$ to $P_3$ ($P_2 \rightarrow P_3$), the mode change command is judged to be present.

At step S18, subsequent to the judgment of the presence of the EV→HEV mode change command at step S17, the line pressure PL is held at the EV mode line pressure $PL_{EV}$, and the routine proceeds to step S19.

At step S19, subsequent to the line pressure holding control at step S18, a judgment is made as to whether or not the revolution speed difference between the engine rpm Ne and the motor revolution speed Nm is less than or equal to a second threshold value $\Delta N_2$, i.e. a judgment is made as to whether or not the engagement of the first clutch CL1 starts.

If YES (the revolution speed difference is the second threshold value $\Delta N2$ or less), the routine proceeds to step S20. If NO (the revolution speed difference is greater than the second threshold value $\Delta N2$), the routine proceeds to step S18.

At step S20, subsequent to step S19 at which the revolution speed difference is judged to be the second threshold value $\Delta N2$ or less, the input torque Tin to the second clutch CL2 is read, and the routine proceeds to step S21.

At step S21, subsequent to the reading of the input torque Tin at step S20, the HEV mode line pressure $PL_{HEV}$ is set to a value (line pressure) obtained by the HEV-PL map in FIG. 6, and the routine proceeds to step S22.

At step S22, subsequent to the setting of the HEV mode line pressure $PL_{HEV}$ at step S21, a ramp output control of the line pressure is executed, and the routine proceeds to step S23. With respect to the ramp output control, first, as an initial value of an operation value $PL_{n-1}$, the EV mode line pressure $PL_{EV}$ is set. And a constant value $\Delta PL$ is subtracted from this operation value $PL_{n-1}$ (at the start of operation, it is $PL_{EV}$), then a calculation value $PL_n$ is determined. By setting this calculation value $PL_n$ as the line pressure PL, the ramp output control is executed.

At step S23, subsequent to the ramp output control at step S22, a judgment is made as to whether or not a currently set line pressure PL, i.e. the calculation value $PL_n$ is identical with (or equal to) the HEV mode line pressure $PL_{HEV}$. If YES (the line pressure is identical), the routine returns to step S1. If NO (the line pressure is not identical), the routine proceeds to step S24.

At step S24, subsequent to step S23 at which it is judged that the line pressure PL is not identical with the $PL_{HEV}$, the calculation value $PL_n$ is set as the operation value $PL_{n-1}$, and the routine proceeds to step S20. Then, the operation is repeated until the line pressure PL is equal to the HEV mode line pressure $PL_{HEV}$.

In the flow chart, steps S17~S24 correspond to a second line pressure transition control section D5. Steps S20~S24 correspond to a second line pressure ramp control operating section D6.

Here, in the second line pressure transition control section D5, as mentioned above, the mode change command from the EV mode to the HEV mode is issued. Then when engaging the first clutch CL1, until the revolution speed difference between the engine rpm and the motor revolution speed is the second threshold value $\Delta N2$ or less from the start of the engagement, the line pressure PL is set to the EV mode line pressure $PL_{EV}$ that is the pressure level being able to maintain the disengagement of the first clutch CL1. After the revolution speed difference is the second threshold value $\Delta N2$ or less, the line pressure PL is set to the HEV mode line pressure $PL_{HEV}$ that is lower than the EV mode line pressure $PL_{EV}$.

In the second line pressure ramp control operating section D6, the line pressure PL is gradually decreased until the line pressure PL reaches the HEV mode line pressure $PL_{HEV}$ from the EV mode line pressure $PL_{EV}$.

Next, operation of the present invention will be explained.

A technical problem of the line pressure control will be explained first, then the operation by the control apparatus of the hybrid vehicle according to the embodiment 1 will be explained next, in order of a line pressure control operation, an HEV→EV transition line pressure control operation and an EV→HEV transition line pressure control operation.

[Technical Problem of the Line Pressure Control]

Figure 7:
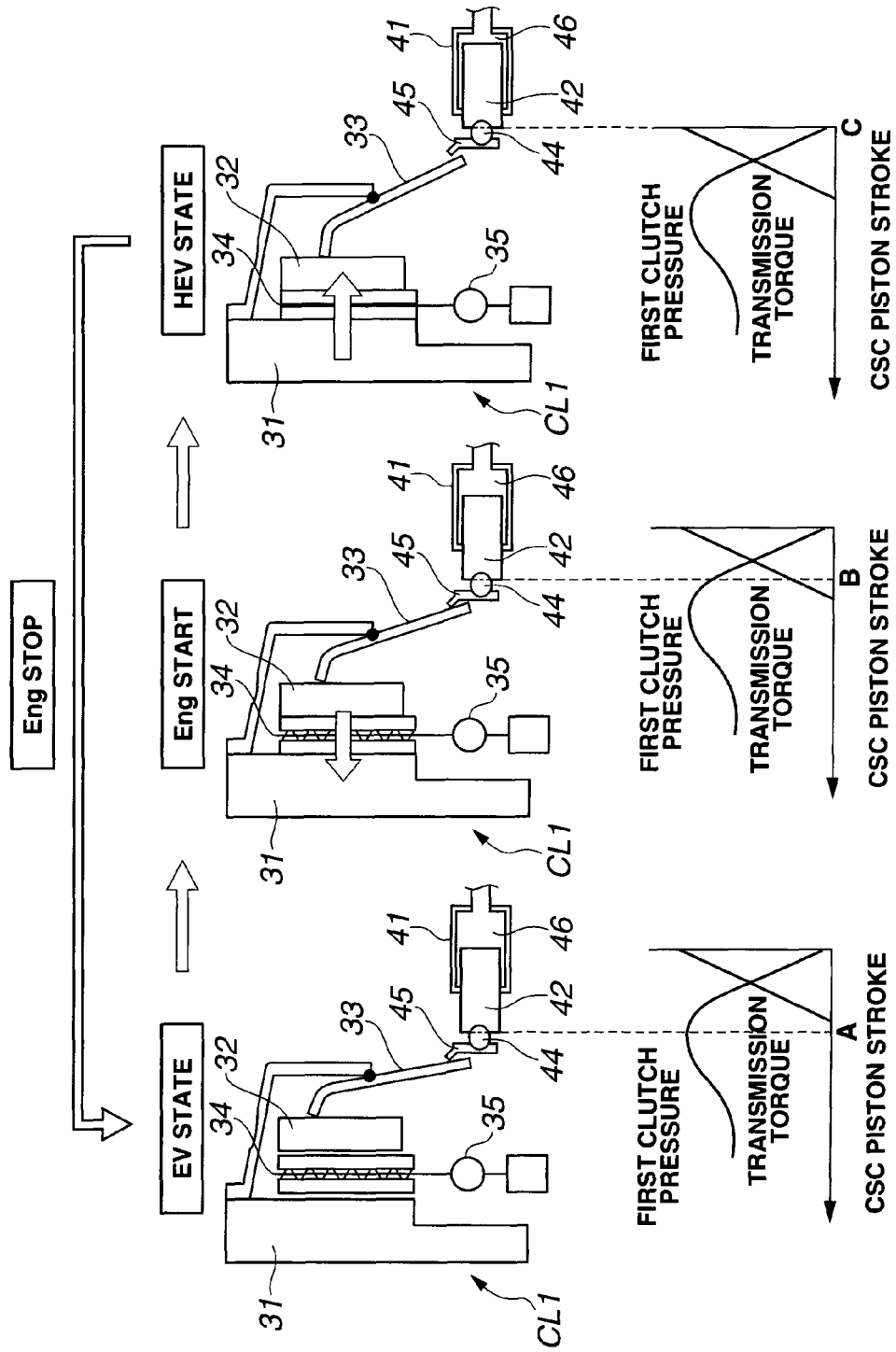
FIG. 7 is a drawing for explaining an engaged state of a first clutch and a relationship between a position of a CSC piston stroke, a first clutch pressure and a transmission torque in this first clutch engaged state, for each drive mode of the vehicle.

FIG. 7 is a drawing for explaining an engaged state of the first clutch and a relationship between a position of the CSC piston stroke, a first clutch pressure and a transmission torque in this first clutch engaged state, for each drive mode of the vehicle. The first clutch pressure is a hydraulic pressure (or simply, pressure) of an inside of the clutch working pressure chamber 46. The transmission torque is a torque transmitted from the engine Eng.

The driveline of the hybrid vehicle has the two drive modes; the EV mode in which the vehicle travels with only the motor/generator MG being the power source and the HEV mode in which the vehicle travels with the engine Eng and the motor/generator MG being the power source. In the EV mode, the engine Eng is stopped, and the first clutch CL1 arranged between the engine Eng and the motor/generator MG is disengaged. As for the HEV mode, the first clutch CL1 is engaged under the engine working condition. Here, the first clutch CL1 is the dry single disc clutch which carries out the clutch engagement by no stroke of the CSC piston 42 when no hydraulic fluid is supplied to the CSC 40 and carries out the clutch disengagement by the stroke of the CSC piston 42 when the hydraulic fluid is supplied to the CSC 40.

In a mechanism or structure of such first clutch CL1, when the first clutch pressure becomes a maximum pressure, the CSC piston stroke is positioned at a maximum protruding position A, and the first clutch CL1 is disengaged against a force of the diaphragm spring 33. The transmission torque from the engine Eng at this time is zero. This state is an EV state (the EV mode).

On the other hand, when the first clutch pressure is set to zero, the CSC piston stroke is positioned at a maximum retracting position C, and the diaphragm spring 33 is not provided with a force from the CSC piston 42, then the first clutch CL1 is engaged. The transmission torque from the engine Eng at this time becomes a maximum. This state is an HEV state (the HEV mode).

Further, when the mode change from the EV mode to the HEV mode is commanded, before completely engaging the first clutch CL1, the engine Eng is started (Eng start state). At this time, the hydraulic fluid filling the clutch working pressure chamber 46 is drained. With this drainage, the first clutch pressure lowers, and the CSC piston stroke is positioned at a middle position B between the maximum protruding position A and the maximum retracting position C. In this state, the force applied to the diaphragm spring 33 is reduced, and the first clutch CL1 is put in a half engaged clutch state. The transmission torque from the engine Eng in this state gradually becomes large with the retraction of the CSC piston 42.

As described above, in the EV mode in which the first clutch CL1 is disengaged, in order to secure the first clutch pressure that moves the CSC piston 42 up to the maximum protruding position A, there is a need to set the line pressure PL to be high. Here, as shown in FIG. 2, since the CSC 40 is placed on the inner side of the rotor of the motor/generator MG, it is impossible or difficult to expand a pressure-receiving area of the CSC piston 42. Because of this, when moving the CSC piston 42, it is necessarily required to increase the hydraulic pressure or to set the hydraulic pressure to be high. On the other hand, in the HEV mode in which the first clutch CL1 is not disengaged, since there is no need to apply the pressure to the CSC piston 42, the setting of the line pressure PL to be high, which is a pressure level required for the disengagement of the first clutch CL1, is not required. In other words, in the HEV mode, the setting of the high line pressure PL is not needed as long as the pressure level required for the engagement of the second clutch CL2, which is equal to a pressure level in the engine vehicle, is secured.

In contrast to this, in the related art hybrid vehicles, the line pressure PL is set to the minimum pressure level required for the engagement/disengagement of the clutch irrespective of the drive mode. However, in this case, even in the HEV mode in which there is no need to disengage the first clutch CL1, the line pressure PL is set to the high pressure level required for the disengagement of the first clutch CL1. This results in poor fuel economy. Thus, there has been a demand that the line pressure PL remain held at the pressure level required for the engagement of the second clutch CL2, which is equal to the pressure level in the engine vehicle, in the HEV mode in which there is no need to disengage the first clutch CL1 in terms of fuel economy improvement.

Furthermore, at the present time, as the first clutch pressure for disengaging the first clutch CL1, a pressure of 0.63 MPa is necessary. And it is known that once the first clutch CL1 is completely disengaged, the disengaged state of the first clutch CL1 can be maintained even by a lower pressure than the disengagement pressure (0.63 MPa). Thus, there has also been a demand that, even in the EV mode in which the first clutch CL1 is disengaged, the line pressure PL be set to different pressure levels between a drive mode transient scene and a drive mode stable scene.

Moreover, when changing the mode from the EV mode to the HEV mode and starting the engine Eng, this case does not require the increase of the pressure like the disengagement of the first clutch CL1. However, if the line pressure PL is quickly lowered, there is a risk that the first clutch CL1 will be engaged again. For this reason, there is a demand that the lowering of the line pressure PL be delayed by a constant time period from the engine start.

In view of the above demands, in the present invention, by the line pressure control for the hybrid vehicle, the line pressure PL is changed in accordance with the drive mode. Further, upon the transition of the drive mode, by correcting or changing (or controlling) the line pressure, the required pressure can be readily obtained. These controls give rise to the fuel economy improvement.

[Line Pressure Control Operation]

Figure 8:
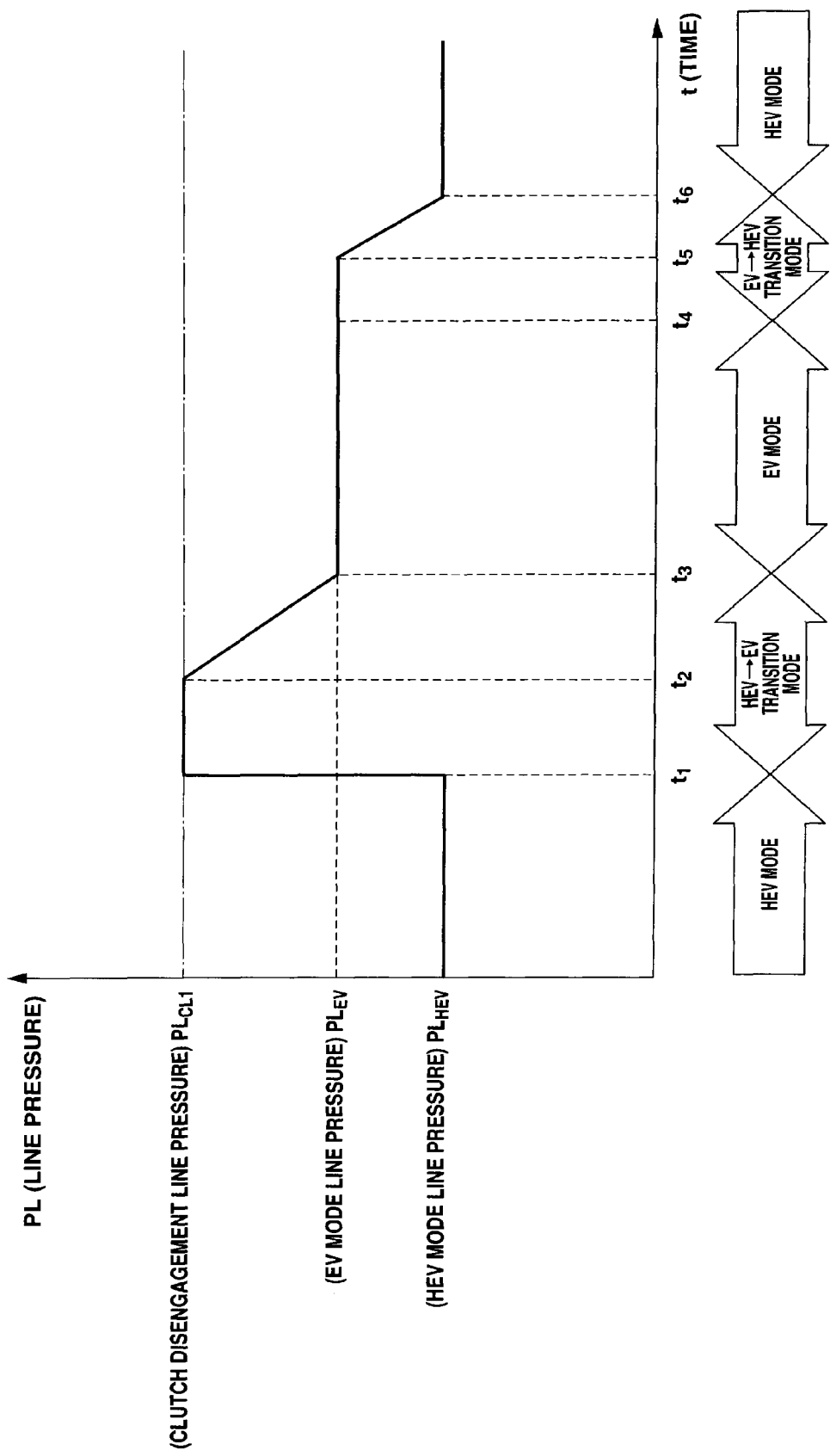
FIG. 8 is a time chart showing an example of transition of the line pressure in accordance with a drive mode change in the control apparatus of the embodiment 1.

FIG. 8 is a time chart showing an example of transition of the line pressure in accordance with the drive mode change in the control apparatus of the embodiment 1. Here, FIG. 8 shows a case where the input torque Tin is a constant value in the torque area of the threshold torque $T_1$ or smaller, where the input torque Tin cannot disengage the first clutch CL1.

Further, in FIG. 8, time $t_1$ is a time point when the mode change command from the HEV mode to the EV mode is outputted. Time $t_2$ is a time point when the revolution speed difference between the engine rpm Ne and the motor revolution speed Nm becomes the first threshold value $\Delta N1$ or more. Time $t_3$ is a time point when the line pressure PL becomes equal to the EV mode line pressure $PL_{EV}$. Time $t_4$ is a time point when the mode change command from the EV mode to the HEV mode is outputted. Time $t_5$ is a time point when the revolution speed difference between the engine rpm Ne and the motor revolution speed Nm becomes the second threshold value $\Delta N2$ or less. Time $t_6$ is a time point when the line pressure PL becomes equal to the HEV mode line pressure $PL_{HEV}$.

In the HEV modes before time $t_1$ and after time $t_6$, in the flow chart in FIG. 5, the routine proceeds in order of step S1→step S2→step S3→step S4→step S5, and the HEV mode line pressure control is executed. Here, at this time, the motor WSC mode is not selected. With this control, in the HEV mode, the line pressure PL is set to the HEV mode line pressure $PL_{HEV}$ using the HEV-PL map shown in FIG. 6. As previously described above, the HEV-PL map is the HEV mode line pressure characteristic that proportionately increases according to the input torque Tin to the second clutch CL2 while securing the pressure level required for the engagement of the second clutch CL2. Therefore, the HEV mode line pressure $PL_{HEV}$ is set to the pressure level that allows the engagement of the second clutch CL2. That is, in the HEV mode, the line pressure PL is set to the pressure level required for the engagement of the second clutch CL2.

On the other hand, in the EV mode from time $t_3$ to time $t_4$, in the flow chart in FIG. 5, the routine proceeds in order of step S1→step S2→step S16→step S17, and the EV mode line pressure control is executed. With this control, in the EV mode, the line pressure PL is set to the EV mode line pressure $PL_{EV}$ using the EV-PL map shown in FIG. 6. As previously described above, the EV-PL map is the EV mode line pressure characteristic whose line pressure PL is set to the high level of the pressure that can maintain the disengaged state of the first clutch CL1 in the low torque area (torque area of the threshold torque $T_1$ or smaller) where the input torque Tin cannot disengage the first clutch CL1 on the HEV mode line pressure characteristic (the HEV-PL map). That is, when the input torque Tin is the threshold torque $T_1$ or smaller, the EV mode line pressure $PL_{EV}$ is set so that the EV mode line pressure $PL_{EV}$ is higher than the line pressure $PL_{HEV}$ of the HEV mode.

With this control, in the HEV mode in which there is no need to disengage the first clutch CL1, the line pressure PL is set to the pressure level required for the engagement of the second clutch CL2. On the other hand, in the EV mode in which the disengaged state of the first clutch CL1 is required, the line pressure setting is changed so that the line pressure PL is higher than that of the HEV mode.

Accordingly, in the HEV mode in which the required line pressure is low, the line pressure can remain held at the pressure level required for the engagement of the second clutch CL2, which is equal to the pressure level in the engine vehicle. That is, the line pressure PL is not set to the unnecessarily high pressure level, namely that the line pressure PL is not set to be high more than necessary. This prevents the increase in the loss of power, and results in fuel economy improvement. Further, in the EV mode in which the first clutch CL1 has to be disengaged by applying the high pressure, the line pressure PL is set to be high, and the pressure level required for the disengagement of the first clutch CL1 is readily obtained. Hence, in the present invention, it is possible to readily obtain the required pressure that puts the first clutch CL1 in the disengaged state, and to improve the fuel economy by changing the setting of the line pressure PL in accordance with the drive mode.

In particular, in the above embodiment 1, the line pressure characteristic setting section, which is the memory M, is provided, and sets the HEV-PL map that proportionately increases according to the input torque Tin and the EV-PL map whose line pressure PL is set to the high level of the pressure in the area of the threshold torque $T_1$ or smaller where the input torque Tin cannot disengage the first clutch CL1 on the HEV-PL map.

That is, in the case where the line pressure PL obtained using the HEV-PL map is able to disengage the first clutch CL1, the EV-PL map is identical with the HEV-PL map. And only in the case where the line pressure PL obtained using the HEV-PL map is not able to disengage the first clutch CL1, the line pressure PL is set to be high. As a consequence, in the EV mode, while maintaining the disengaged state of the first clutch CL1, occasion for setting the line pressure PL to be high can be minimized, then the fuel economy is further improved.

Here, in a case where the motor WSC mode is selected in the HEV modes before time $t_1$ and after time $t_6$, in the flow chart in FIG. 5, the routine proceeds in order of step S1→step S2→step S3→step S16→step S17, and the EV mode line pressure control is executed. With this control, even in the HEV mode, if the motor WSC mode is selected, the line pressure PL can be set to be high. Thus, this can avoid a situation where the disengaged state of the first clutch CL1 cannot be achieved by the fact that the line pressure PL is set to the HEV mode line pressure $PL_{HEV}$.

[HEV→EV Transition Line Pressure Control Operation]

In the HEV→EV transition mode from time $t_1$ to time $t_3$ in FIG. 8, in the flow chart in FIG. 5, the routine proceeds in order of step S5→step S6→step S7→step S8 or step S9→step S10→step S11→step S12→step S13→step S14→step S15, and the HEV→EV line pressure transition control is executed. With this control, when the mode change command from the HEV mode to the EV mode is issued, until the revolution speed difference between the engine rpm Ne and the motor revolution speed Nm is the first threshold value $\Delta N1$ or greater (for a period from time $t_1$ to time $t_2$), the line pressure PL is set to the first clutch disengagement line pressure $PL_{CL1}$ that is the pressure level achieving the disengagement of the first clutch CL1, and afterwards the line pressure PL is set to the EV mode line pressure $PL_{EV}$ obtained by the EV-PL map.

That is, in the first line pressure transition control section D2, when disengaging the first clutch CL1 through the supply of the hydraulic pressure by the mode change command from the HEV mode to the EV mode, in an early stage of the disengaged state where the higher pressure than the pressure maintaining the disengaged state is necessary, i.e. only in the HEV→EV transition mode, the line pressure PL is set to the first clutch disengagement line pressure $PL_{CL1}$ that is higher than the EV mode line pressure $PL_{EV}$. Hence, upon the disengagement of the first clutch CL1, the pressure level can be set to the different levels between the transient scene in which the higher pressure level is necessary and the steady EV mode in which the clutch disengaged state can be held by the lower pressure level than the pressure level in the transient scene. And the disengaged state of the first clutch CL1 can be ensured while further improving the fuel economy by minimizing the occasion for setting the line pressure PL to be high.

In particular, in the first line pressure transition control section D2, since the disengagement pressure control operation of step S7→step S8 or step S9→step S10 is carried out, in the case where the oil amount for the first clutch disengagement line pressure $PL_{CL1}$ cannot be obtained by the discharge pressure from the mechanical oil pump OP, the oil amount shortage can be compensated by the electric pump EP, namely that the oil amount equivalent to the shortage can be discharged by the electric pump EP. Therefore, the required line pressure PL can be secured without increasing a revolution speed of the mechanical oil pump OP, and the deterioration of fuel economy can be prevented. Moreover, only when the first clutch CL1 is disengaged, the line pressure PL becomes high. This additional pressure is supplied by the electric pump EP. Thus, a small mechanical oil pump OP designed for the low line pressure PL can be utilized, and this does not require an unnecessarily large mechanical oil pump.

In addition, in this first line pressure transition control section D2, for a period from time $t_2$ to time $t_3$ in FIG. 8, the EV ramp control operation of step S11→step S12→step S13→step S14→step S15 is carried out. It is therefore possible to gradually decrease the line pressure PL from the first clutch disengagement line pressure $PL_{CL1}$ up to the EV mode line pressure $PL_{EV}$. With this control, a shock caused by the change of the line pressure setting can be reduced or absorbed.

[EV→HEV Transition Line Pressure Control Operation]

In the EV→HEV transition mode from time $t_4$ to time $t_6$ in FIG. 8, in the flow chart in FIG. 5, the routine proceeds in order of step S17→step S18→step S19→step S20→step S21→step S22→step S23→step S24, and the EV→HEV line pressure transition control is executed. With this control, when the mode change command from the EV mode to the HEV mode is issued, until the revolution speed difference between the engine rpm Ne and the motor revolution speed Nm is the second threshold value $\Delta N2$ or less (for a period from time $t_4$ to time $t_5$), the line pressure PL is held at the EV mode line pressure $PL_{EV}$ obtained by the EV-PL map, and afterwards the line pressure PL is set to HEV mode line pressure $PL_{HEV}$ obtained by the HEV-PL map.

That is, in the second line pressure transition control section D5, when engaging the first clutch CL1 through the drainage of the hydraulic pressure by the mode change command from the EV mode to the HEV mode, in an early stage of the mode change, by holding the line pressure PL at the EV mode line pressure $PL_{EV}$ that is higher than the HEV mode line pressure $PL_{HEV}$, the timing of the lowering of the line pressure PL can be delayed as compared with the timing of the engine start. Consequently, it is possible to prevent the line pressure PL from immediately or quickly lowering in a transient scene of the engine start, and prevent the re-engagement of the first clutch CL1.

Further, in the second line pressure transition control section D5, for a period from time $t_5$ to time $t_6$ in FIG. 8, the HEV ramp control operation of step S20→step S21→step S22→step S23→step S24 is carried out. It is therefore possible to gradually decrease the line pressure PL from the EV mode line pressure $PL_{EV}$ up to the HEV mode line pressure $PL_{HEV}$. With this control, a shock caused by the change of the line pressure setting can be reduced or absorbed.

Next, effects of the present invention will be explained. The control apparatus of the hybrid vehicle in the embodiment 1 provides the following effects.

(1) The control apparatus of the hybrid vehicle, the hybrid vehicle having the first clutch CL1 which is arranged between the engine Eng and the motor/generator MG and is in the disengaged state by being supplied with the hydraulic fluid and the second clutch CL2 which is arranged between the motor/generator MG and driving wheels (rear left and right wheels RL, RR) and is in the engaged state by being supplied with the hydraulic fluid, the control apparatus comprises the line pressure control means D1 that controls the line pressure PL of the hydraulic fluid supplied to the first and second clutches CL1, CL2; and the drive mode control means (the mode selecting section 200) that changes the drive mode between the HEV mode in which the first clutch CL1 is engaged and the vehicle travels with the engine Eng and the motor/generator MG being the power source and the EV mode in which the first clutch CL1 is disengaged and the vehicle travels with only the motor/generator MG being the power source, and the line pressure control means D1 sets the line pressure PL in the HEV mode to the pressure level required for the engagement of the second clutch CL2 and sets the line pressure PL in the EV mode to the higher line pressure than the line pressure PL in the HEV mode. With this, it is possible to readily obtain the required pressure that achieves the disengaged state of the first clutch CL1, and also to improve the fuel economy by changing the line pressure setting in accordance with the drive mode.

(2) The line pressure control means D1 has a line pressure characteristic setting section (the memory M) for setting the line pressure characteristic on the basis of the line pressure setting parameter that is the input torque Tin to the second clutch CL2, and the line pressure characteristic setting section (the memory M) sets the HEV mode line pressure characteristic (the HEV-PL map) that proportionately increases according to the line pressure setting parameter, and sets the EV mode line pressure characteristic (the EV-PL map) by which the line pressure PL is set to such a high level as to maintain the disengaged state of the first clutch CL1 in the low parameter area (the torque area where the input torque Tin is the threshold torque $T_1$ or smaller) where the line pressure setting parameter cannot achieve the disengaged state of the first clutch CL1 on the HEV mode line pressure characteristic. Thus, in the EV mode, while maintaining the disengaged state of the first clutch CL1, occasion for setting the line pressure PL to be high can be minimized, then the fuel economy is further improved.

(3) The line pressure control means D1 has the first line pressure transition control section D2 for setting the line pressure PL when disengaging the first clutch CL1 after the mode change command from the HEV mode to the EV mode is issued, and the first line pressure transition control section D2 sets the line pressure PL to the first clutch disengagement line pressure $PL_{CL1}$ that is the pressure level required for the disengagement of the first clutch CL1 until the condition that the revolution speed difference between the engine rpm Ne and the motor revolution speed Nm is the first threshold value ΔN1 or more is satisfied from the start of the first clutch disengagement, and sets the line pressure PL to the EV mode line pressure $PL_{EV}$ which is lower than the first clutch disengagement line pressure $PL_{CL1}$ and is able to maintain the disengaged state of the first clutch CL1 after the the condition is satisfied.

Hence, the disengaged state of the first clutch CL1 can be ensured while further improving the fuel economy by minimizing the occasion for setting the line pressure PL to be high.

(4) The first line pressure transition control section D2 has the disengagement pressure control operating section D3 by which, in the case where the oil amount for the first clutch disengagement line pressure $PL_{CL1}$ cannot be obtained by the discharge pressure from the mechanical oil pump OP that is driven by the engine Eng or the motor/generator MG, the oil amount shortage is compensated by the electric pump EP.

Therefore, the required line pressure PL can be secured without increasing the revolution speed of the mechanical oil pump OP, and the deterioration of fuel economy can be prevented.

(5) The first line pressure transition control section D2 has the first line pressure ramp control operating section D4 that gradually decreases the line pressure PL from the first clutch disengagement line pressure $PL_{CL1}$ to the EV mode line pressure $PL_{EV}$. With this control, the shock caused by the change of the line pressure setting can be reduced or absorbed.

(6) The line pressure control means D1 has the second line pressure transition control section D5 for setting the line pressure PL when engaging the first clutch CL1 after the mode change command from the EV mode to the HEV mode is issued, and the second line pressure transition control section D5 holds the line pressure PL at the EV mode line pressure $PL_{EV}$ until the condition that the revolution speed difference between the engine rpm Ne and the motor revolution speed Nm is the second threshold value ΔN2 or less is satisfied from the start of the first clutch engagement, and sets the line pressure PL to the HEV mode line pressure $PL_{HEV}$ that is lower than the EV mode line pressure $PL_{EV}$ after the condition is satisfied. Consequently, it is possible to prevent the line pressure PL from immediately or quickly lowering in the transient scene of the engine start, and prevent the re-engagement of the first clutch CL1.

(7) The second line pressure transition control section D5 has the second line pressure ramp control operating section D6 that gradually decreases the line pressure PL from the EV mode line pressure $PL_{EV}$ to the HEV mode line pressure $PL_{HEV}$.

With this control, the shock caused by the change of the line pressure setting can be reduced or absorbed.

(8) When the command of the motor WSC control in which the first clutch CL1 is disengaged while controlling the second clutch CL2 to the slip-engaged state is issued in the HEV mode, the line pressure control means D1 sets the line pressure PL to be higher than the line pressure PL in the HEV mode.

Thus, this can avoid the situation where the disengaged state of the first clutch CL1 cannot be achieved by the fact that the line pressure PL is set to the HEV mode line pressure $PL_{HEV}$.

Although the control apparatus of the hybrid vehicle according to the present invention has been explained on the basis of the embodiment 1, the present invention is not limited to the embodiment 1.

In the embodiment 1, upon the disengagement of the first clutch CL1, as the line pressure changing condition of the line pressure PL from the first clutch disengagement line pressure $PL_{CL1}$ to the ramp control operation, when the revolution speed difference between the engine rpm Ne and the motor revolution speed Nm is the first threshold value ΔN1 or greater, the ramp control operation is carried out. However, for instance, it could be possible to switch the line pressure control to the ramp control after a certain time elapses from the setting of the line pressure PL to the first clutch disengagement line pressure $PL_{CL1}$. That is, at step S10 in FIG. 5, instead of the judgment of the revolution speed difference, a judgment is made as to whether or not the predetermined time elapses after setting the line pressure PL to the first clutch disengagement line pressure $PL_{CL1}$.

Further, in the embodiment 1, upon the disengagement of the first clutch CL1, as the line pressure changing condition of the line pressure PL from the EV mode line pressure $PL_{EV}$ to the ramp control operation, when the revolution speed difference between the engine rpm Ne and the motor revolution speed Nm is the second threshold value ΔN2 or less, the ramp control operation is carried out. However, for instance, it could be possible to switch the line pressure control to the ramp control after a certain time elapses from the holding of the line pressure PL at the EV mode line pressure $PL_{EV}$. That is, at step S19 in FIG. 5, instead of the judgment of the revolution speed difference, a judgment is made as to whether or not the predetermined time elapses after holding the line pressure PL at the EV mode line pressure $PL_{EV}$.

Furthermore, in the embodiment 1, as the line pressure setting parameter, the input torque Tin to the second clutch CL2 is used. However, the line pressure setting parameter is not limited to this. For example, it could be an input revolution speed of the second clutch CL2, or might be the both of the input torque Tin and the input revolution speed.

Moreover, in the embodiment 1, as the second clutch CL2, any one of the plurality of frictional engagement elements, which are engaged in each speed or each shift stage in the automatic transmission AT, is selected. However, the second clutch CL2 is not limited to this as long as the clutch is arranged between the motor/generator MG and the driving wheels and is engaged through the application of the hydraulic pressure. The special clutch could be provided as the second clutch CL2.

In the embodiment 1, although the present invention is applied to the hybrid vehicle in which the automatic transmission having forward 7 speeds and reverse 1 speed is mounted, the present invention can be applied to a hybrid vehicle in which an automatic transmission having forward multi-speeds or a CVT (continuously variable transmission) is mounted.

The entire contents of Japanese Patent Application No. 2008-243650 filed on Sep. 24, 2008 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control apparatus of a hybrid vehicle, the hybrid vehicle having a first clutch which is arranged between an engine and a motor/generator and is in a disengaged state by being supplied with a hydraulic fluid and a second clutch which is arranged between the motor/generator and driving wheels and is in an engaged state by being supplied with the hydraulic fluid, the control apparatus comprising:
    a line pressure controller that controls a line pressure of the hydraulic fluid supplied to the first and second clutches; and
    a drive mode controller that changes a drive mode between an HEV mode in which the first clutch is engaged and the vehicle travels with the engine and the motor/generator being a power source and an EV mode in which the first clutch is disengaged and the vehicle travels with only the motor/generator being the power source, and
    the line pressure controller setting the line pressure in the HEV mode to a pressure level required for the engagement of the second clutch and setting the line pressure in the EV mode to a higher line pressure than the line pressure in the HEV mode.

2. The control apparatus of the hybrid vehicle as claimed in claim 1, wherein:
    the line pressure controller has a line pressure characteristic setting section for setting a line pressure characteristic on the basis of a line pressure setting parameter including at least one of an input torque and an input revolution speed of the second clutch, and
    the line pressure characteristic setting section sets an HEV mode line pressure characteristic that proportionately increases according to the line pressure setting parameter, and sets an EV mode line pressure characteristic by which the line pressure is set to such a high level as to maintain the disengaged state of the first clutch in a low parameter area where the line pressure setting parameter cannot achieve the disengaged state of the first clutch on the HEV mode line pressure characteristic.

3. The control apparatus of the hybrid vehicle as claimed in claim 1, wherein:
    when a command of a motor WSC control in which the first clutch is disengaged while controlling the second clutch to a slip-engaged state is issued in the HEV mode, the line pressure controller sets the line pressure to be higher than the line pressure in the HEV mode.

4. The control apparatus of the hybrid vehicle as claimed in claim 1, wherein:
    the line pressure controller has a second line pressure transition control section for setting the line pressure when engaging the first clutch after a mode change command from the EV mode to the HEV mode is issued, and
    the second line pressure transition control section holds the line pressure at an EV mode line pressure until a predetermined condition is satisfied from the start of the first clutch engagement, and sets the line pressure to an HEV mode line pressure that is lower than the EV mode line pressure after the predetermined condition is satisfied.

5. The control apparatus of the hybrid vehicle as claimed in claim 4, wherein:
    as the predetermined condition, it is judged whether or not a revolution speed difference between an engine rpm and a motor revolution speed is a second threshold value or less.

6. The control apparatus of the hybrid vehicle as claimed in claim 4, wherein:
    as the predetermined condition, it is judged whether or not a certain time elapses after holding the line pressure at the EV mode line pressure.

7. The control apparatus of the hybrid vehicle as claimed in claim 4, wherein:
    the second line pressure transition control section has a second line pressure ramp control operating section that gradually decreases the line pressure from the EV mode line pressure to the HEV mode line pressure.

8. The control apparatus of the hybrid vehicle as claimed in claim 1, wherein:
    the line pressure controller has a first line pressure transition control section for setting the line pressure when disengaging the first clutch after a mode change command from the HEV mode to the EV mode is issued, and
    the first line pressure transition control section sets the line pressure to a first clutch disengagement line pressure that is a pressure level required for the disengagement of the first clutch until a predetermined condition is satisfied from the start of the first clutch disengagement, and sets the line pressure to an EV mode line pressure which is lower than the first clutch disengagement line pressure and is able to maintain the disengaged state of the first clutch after the predetermined condition is satisfied.

9. The control apparatus of the hybrid vehicle as claimed in claim 8, wherein:
    as the predetermined condition, it is judged whether or not a revolution speed difference between an engine rpm and a motor revolution speed is a first threshold value or more.

10. The control apparatus of the hybrid vehicle as claimed in claim 8, wherein:
    as the predetermined condition, it is judged whether or not a certain time elapses after setting the line pressure to the first clutch disengagement line pressure.

11. The control apparatus of the hybrid vehicle as claimed in claim 8, wherein:
    the first line pressure transition control section has a disengagement pressure control operating section by which, in a case where an oil amount for the first clutch disengagement line pressure cannot be obtained by a discharge pressure from a mechanical oil pump that is driven by the engine or the motor/generator, the oil amount shortage is compensated by an electric pump.

12. The control apparatus of the hybrid vehicle as claimed in claim 8, wherein:
    the first line pressure transition control section has a first line pressure ramp control operating section that gradually decreases the line pressure from the first clutch disengagement line pressure to the EV mode line pressure.

13. A method for controlling a line pressure of a hydraulic fluid for a hybrid vehicle, the hybrid vehicle having a first clutch which is arranged between an engine and a motor/generator and is in a disengaged state by being supplied with the hydraulic fluid and a second clutch which is arranged between the motor/generator and driving wheels and is in an engaged state by being supplied with the hydraulic fluid, the hybrid vehicle further having the following drive modes; an HEV mode in which the first clutch is engaged and the vehicle travels with the engine and the motor/generator being a power source and an EV mode in which the first clutch is disengaged and the vehicle travels with only the motor/generator being the power source, the method comprising:

setting the line pressure in the HEV mode to a pressure level required for the engagement of the second clutch, and setting the line pressure in the EV mode to a higher line pressure than the line pressure in the HEV mode.

14. The method for controlling the line pressure for the hybrid vehicle as claimed in claim 13, further comprising:

when changing the mode from the HEV mode to the EV mode, setting the line pressure to a first clutch disengagement line pressure that is a pressure level required for the disengagement of the first clutch until a predetermined condition is satisfied from the start of the first clutch disengagement, and setting the line pressure to an EV mode line pressure which is lower than the first clutch disengagement line pressure and is able to maintain the disengaged state of the first clutch after the predetermined condition is satisfied.

15. The method for controlling the line pressure for the hybrid vehicle as claimed in claim 13, further comprising:

when changing the mode from the EV mode to the HEV mode, holding the line pressure at an EV mode line pressure until a predetermined condition is satisfied from the start of the first clutch engagement, and setting the line pressure to an HEV mode line pressure that is lower than the EV mode line pressure after the predetermined condition is satisfied.

\* \* \* \* \*